(12) United States Patent
De Coi et al.

(10) Patent No.: US 8,280,102 B2
(45) Date of Patent: Oct. 2, 2012

(54) DEVICE FOR CONTROLLING A DRIVEN MOVEMENT ELEMENT, PARTICULARLY A DOOR OR A GATE

(75) Inventors: Beat De Coi, Sargans (CH); Peter Nebiker, Malans (CH); Bas Albers, Widenswil (CH); Daniel Lippuner, Jenins (CH)

(73) Assignee: Cedes AG, Landquart (CH)

( * ) Notice: Subject to any disclaimer, the term of this patent is extended or adjusted under 35 U.S.C. 154(b) by 104 days.

(21) Appl. No.: 12/753,951

(22) Filed: Apr. 5, 2010

(65) Prior Publication Data

US 2010/0254570 A1    Oct. 7, 2010

Related U.S. Application Data

(63) Continuation of application No. PCT/EP2008/008442, filed on Oct. 6, 2008.

(30) Foreign Application Priority Data

Oct. 5, 2007  (DE) .................... 20 2007 013 986 U

(51) Int. Cl.
*G06K 9/00* (2006.01)
(52) U.S. Cl. ........................................ 382/100; 340/630
(58) Field of Classification Search .................. 382/100, 382/102, 103; 250/559.2, 229.39; 356/601
See application file for complete search history.

(56) References Cited

U.S. PATENT DOCUMENTS

| | | | | |
|---|---|---|---|---|
| 3,891,064 | A | * | 6/1975 | Clark .............................. 187/295 |
| 4,029,176 | A | * | 6/1977 | Mills .............................. 187/317 |
| 4,203,100 | A | | 5/1980 | Yamauchi et al. |
| 4,528,555 | A | * | 7/1985 | Yasukawa et al. ............ 340/630 |
| 4,614,968 | A | | 9/1986 | Rattman et al. |
| 4,651,013 | A | * | 3/1987 | Kajii et al. ..................... 250/573 |
| 6,304,178 | B1 | * | 10/2001 | Hayashida ................. 340/545.1 |
| 6,452,353 | B1 | * | 9/2002 | Calamatas .................... 318/466 |
| 7,663,737 | B2 | * | 2/2010 | Albers et al. .................. 356/5.01 |
| 7,718,938 | B2 | * | 5/2010 | Kurihara et al. .......... 250/201.2 |
| 2008/0158878 | A1 | * | 7/2008 | Van Laanen et al. ......... 362/235 |
| 2009/0072170 | A1 | | 3/2009 | Kurihara et al. |

FOREIGN PATENT DOCUMENTS

| | | |
|---|---|---|
| EP | 0 699 619 A2 | 3/1996 |
| GB | 2 315 134 A1 | 1/1998 |
| GB | 2 334 096 A1 | 8/1999 |
| WO | 83/02187 A1 | 6/1983 |
| WO | 03/001187 A1 | 1/2003 |
| WO | 2006/112431 A1 | 10/2006 |

* cited by examiner

*Primary Examiner* — Chan Park
*Assistant Examiner* — Nancy Bitar
(74) *Attorney, Agent, or Firm* — Burr & Brown

(57) ABSTRACT

A device for controlling a driven movement element with an electronic unit is proposed, which comprises a transmitter for electromagnetic radiation, for example, light, in particular infrared light, and a receiver for electromagnetic radiation emitted by a transmitter for the detection of objects on a propagation path between transmitter and receiver. According to the invention, the electronic unit is designed to detect a temporal change in at least one feature derived from the received electromagnetic radiation and, upon a detection of a change in the at least one feature that is comparatively slow over time, to output a signal that is associated with a detection of smoke.

9 Claims, 3 Drawing Sheets

DEVICE FOR CONTROLLING A DRIVEN MOVEMENT ELEMENT, PARTICULARLY A DOOR OR A GATE

CROSS REFERENCE TO RELATED APPLICATIONS

This application is a continuation of International Application No. PCT/EP2008/008442 filed Oct. 6, 2008, which designated the United States, and claims the benefit under 35 USC §119(a)-(d) of German Application No. 20 2007 013 986.1 filed Oct. 5, 2007, the entireties of which are incorporated herein by reference.

FIELD OF THE INVENTION

The invention relates to a device for controlling a driven movement element.

BACKGROUND OF THE INVENTION

In an elevator, for example a passenger elevator in a building, the automatic elevator doors are routinely monitored in respect of whether an object is situated in their movement path. If this is the case, the door is not closed, in order that a collision, for example with a person, cannot occur. Under normal conditions, this is certainly a correct approach. In the case of a fire, however, serious problems can occur since no distinction is made between smoke and an object. The following scenario can arise:

An elevator stops at a floor where there is a fire. The door opens and smoke enters the elevator car. People in the lift would like to leave this floor again as rapidly as possible. This is not possible, however, since the door sensor identifies the smoke as an object and therefore does not permit a control to the effect that the elevator doors close. People have already died in such a situation.

British Patent Application No. GB 23 15 134 A discloses an elevator door control system in which the elevator doors are not closed if an object is detected by a series of sensors. However, the closure suspension function is inhibited if smoke is detected by a further sensor. This enables the doors to be closed even though the series of sensors per se detects an object, if the smoke sensor detects smoke.

Such an embodiment is comparatively complex and costly.

SUMMARY OF THE INVENTION

The invention is based on the object of providing a device of the type mentioned in the introduction which can be produced comparatively more simply and more cost-effectively, without safety being detrimentally affected as a result.

The invention is based on a device for controlling a driven movement element such as, for example, a door or a gate with an electronic unit, which comprises a transmitter for electromagnetic radiation, for example, light, preferably infrared light, and a receiver for electromagnetic radiation emitted by a transmitter for the detection of objects on a radiation path or light path between transmitter and receiver. A main object of the invention resides in the fact that the electronic unit is designed to detect a temporal change in at least one feature derived from the received electromagnetic radiation and, upon a detection of a change in the at least one feature that is comparatively slow over time, to output a signal that is associated with a detection of smoke. By virtue of this procedure, the same light barrier arrangement which is used for the detection of "conventional" objects in the light path can be used for the detection of smoke, by way of example. This means that essentially no additional outlay on "hardware" is required for the smoke detection, which is manifested in a price advantage.

In this case, the invention is based on the insight that, when smoke occurs, an abrupt change in the radiation path or light path does not take place, rather the propagation conditions for the electromagnetic radiation change slowly, compared with a situation in which an object, for example a person, moves into the propagation path of the electromagnetic radiation.

A slow change in a feature derived from the received electromagnetic radiation can relate to different parameters of the received electromagnetic radiation.

In one preferred embodiment of the invention, the electronic unit is designed to detect the changes in a feature that is representative of the intensity of the received electromagnetic radiation. This approach makes use of the circumstance that, when smoke occurs, a gradual attenuation of the electromagnetic radiation in the light path takes place as a result of reflection and absorption at smoke particles, which is not the case when an object, for example a person or an article, occurs in the propagation path.

Accordingly, it is preferred if the electronic unit is designed, depending on the intensity of the received electromagnetic radiation, to generate a signal that is associated with a detection of an object if the intensity changes abruptly, and to generate a signal that is associated with a detection of smoke if the intensity changes more slowly, in particular significantly more slowly, as measured against the abrupt change in the intensity upon a detection of an object. An abrupt change arises, for example, when the light beam is interrupted by a person moving into the light path at a normal speed.

In one preferred embodiment of the electronic unit, the time is determined from the instant at which the feature that is representative of the intensity falls below a first threshold from the top downward to the instant at which the feature that is representative of the intensity exceeds a second, lower threshold from the top downward.

Starting from a predefined duration, the time determined can be associated with the detection of smoke.

In another preferred configuration of the invention it is advantageous that the electronic unit is able to determine a distance which the electromagnetic radiation covers from the transmitter via a reflection surface to the receiver, by an evaluation of a phase of an oscillation modulated onto the electromagnetic radiation, in which case, upon a detection at the receiver of electromagnetic radiation, which deviates from the modulated oscillation on account of a plurality of superposed oscillations having the same frequency but a different phase angle, smoke in the propagation path is inferred. This procedure makes use of the circumstance that, upon a reflection at a reflection surface with a defined surface area, the modulated signal returns to the receiver without significant deformation of the modulated signal. By contrast, a partial reflection of the light signal takes place at different locations in smoke, as a result of which different phases with regard to the modulated signal arise at the receiver, which results in a change in the form and amplitude of the modulated signal. This change can be evaluated for the smoke detection.

In another embodiment of the invention, the receiver has a plurality of reception regions that can be evaluated separately. Furthermore, the electronic unit is able to determine a distance which the electromagnetic radiation covers from the transmitter via a reflection surface to the receiver, by an evaluation of a phase of an oscillation modulated onto the electromagnetic radiation, in which case, upon a detection of a comparatively slowly changing distance for respectively the plurality of reception regions, smoke in the light path is inferred. By way of example, the receiver is a camera chip having a multiplicity of pixels. If a comparatively slow distance change is respectively measured by all or at least by a predefined number of pixels of the camera chip, smoke is inferred therefrom. Furthermore, it has been found that a change in the measured distance of the pixels involved in the measurement through to an identical distance for all the pixels involved takes place in the case of smoke. As a result, even the unlikely case that a large-area object is moving uniformly and slowly toward the sensor can be ruled out. This is because a change in the distance through to identical distances for the pixels involved in the measurement would not arise in this case.

In another preferred configuration of the invention, a plurality of receivers and transmitters are provided which have the functionality according to the invention. A whole area can thereby be monitored with regard to objects, but also smoke, which further increases safety. In addition, a redundant functionality is obtained in the case of a plurality of receivers and transmitters. The receivers and transmitters preferably form a "light curtain".

In another preferred configuration of the invention, the receiver comprises a camera chip. In the case of such a configuration it is preferred if the at least one feature reflects the contrast of an image, a comparatively slow descrease in the contrast being interpreted as smoke.

In order to define an output contrast, in one preferred configuration, an edge is detected by means of the electronic unit, from which edge the feature that is representative of the contrast can then be derived.

The device for controlling a driven movement element can be part of a door opening controller, but equally part of a safety arrangement that monitors the closing of the door. In this case, the light barrier device can be embodied as a light curtain, light barrier, sensing light barrier or reflection light barrier. The light barrier device can comprise a sensor that enables a distance measurement, according to the time-of-flight principle.

In a further preferred configuration, the device for controlling a driven movement element is active if the movement element, for example a door, is closed. In the case of an elevator door, before the opening of the elevator door, the device can output a signal that exiting is not intended to take place here (because development of smoke has been detected, by way of example).

In the case of this configuration it is preferably the case that the device is activated or remains active as soon as the door is closed.

A device according to the invention for controlling a driven element can furthermore comprise an additional functionality to the effect that a signal that is associated with the detection of a fire is output starting from a specific detected temperature.

In a particularly preferred configuration of the invention, at least the transmitter and the receiver of the device are mounted in movable fashion, for example on a door. In this case, the movement of the door can bring about a slow change in received electromagnetic radiation, which could be interpreted as smoke. In order to prevent this, it is preferred if the device comprises an input by means of which the smoke detection can temporarily be switched off.

BRIEF DESCRIPTION OF THE DRAWINGS

A number of exemplary embodiments of the invention are illustrated in the drawings.

DETAILED DESCRIPTION OF THE INVENTION

Figure 1:
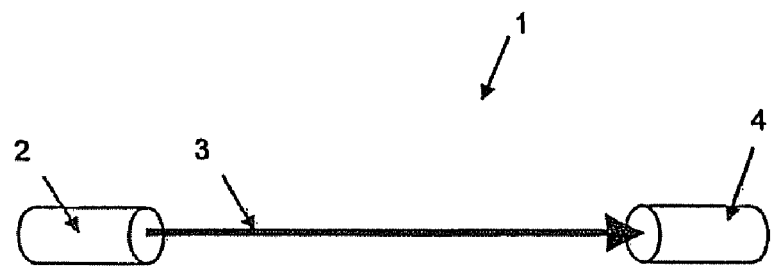
FIGS. 1 to 3 show, in a highly schematic three-dimensional illustration, the function of an optical sensor according to the invention in different detection situations.
Figure 2:
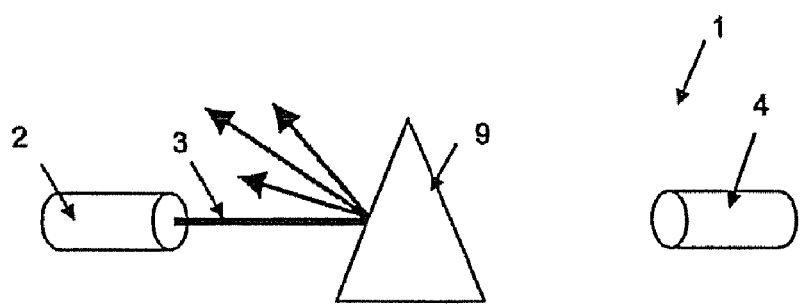

FIGS. 1 and 2 show a light sensor arrangement 1 in a conventional detection mode, in which a transmitter 2 emits light 3, preferably infrared light, which is received by a receiver 4. As long as the light 3 is received at the receiver 4, this is interpreted such that no object is situated in the path of the light 3. As soon as the light 3 no longer reaches the receiver, as is illustrated in FIG. 2, the light sensor arrangement 1 associates this with the detection of an object 9.

Figure 3:
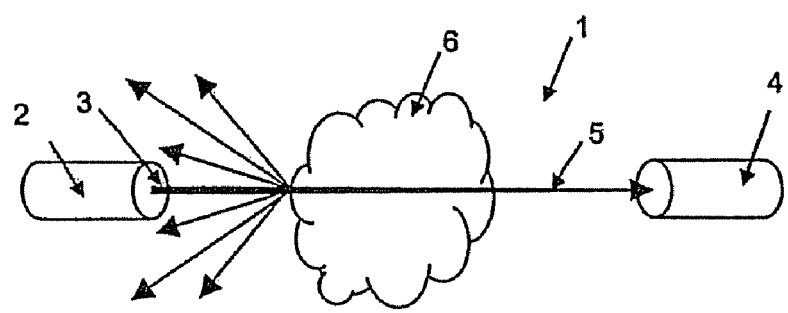

FIG. 3 shows the light sensor arrangement 1 according to the invention in a state in which smoke 6 attenuates the intensity of the light 3 since part of the light 3 is reflected at the smoke. However, a part 5 reaches the receiver 4 despite the smoke 6. Depending on the light intensity, the receiver 4 generates a signal, 7, 7' (in this respect see FIG. 4).

Figure 4:
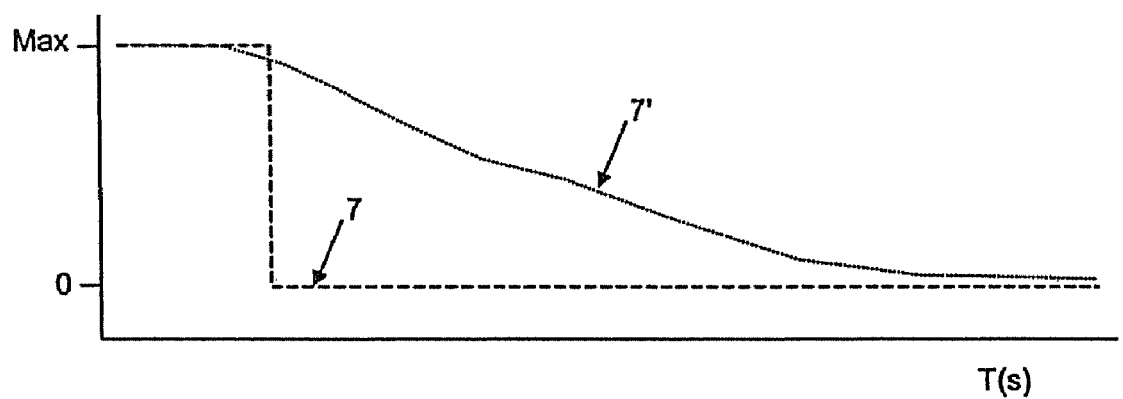
FIG. 4 shows a graph of two intensity functions over time.

The two signals 7, 7' illustrated in FIG. 4 reflect the following detection state:

The signal 7 is at a maximum and is abruptly reduced to zero (this corresponds to the case from FIG. 2). The light sensor arrangement 1 interprets such a signal profile as an object in the light path. If the light is disturbed by the smoke 6, then the signal does not have such an abrupt profile. The signal 7' is initially at a maximum and slowly falls to a value which, if appropriate, has to not quite reach zero.

The light sensor arrangement is preferably designed such that a correspondingly slow profile of the intensity of the light is interpreted as smoke.

Figure 5:
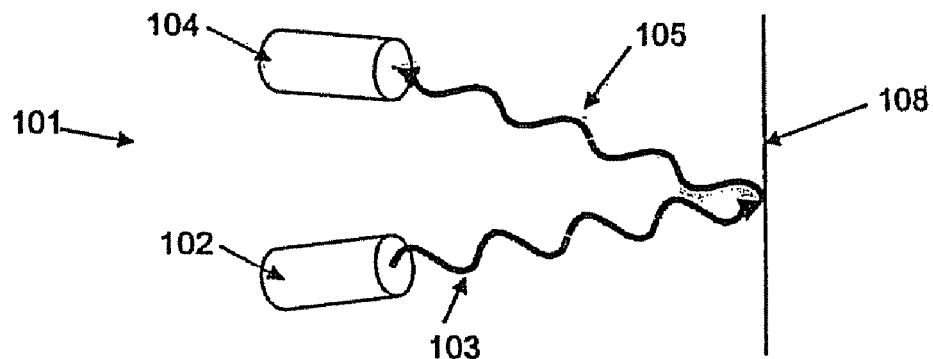
FIGS. 5 to 7 show a further optical sensor arrangement according to the invention in a highly schematic three-dimensional view in the same way as the first embodiment in different detection situations.
Figure 6:
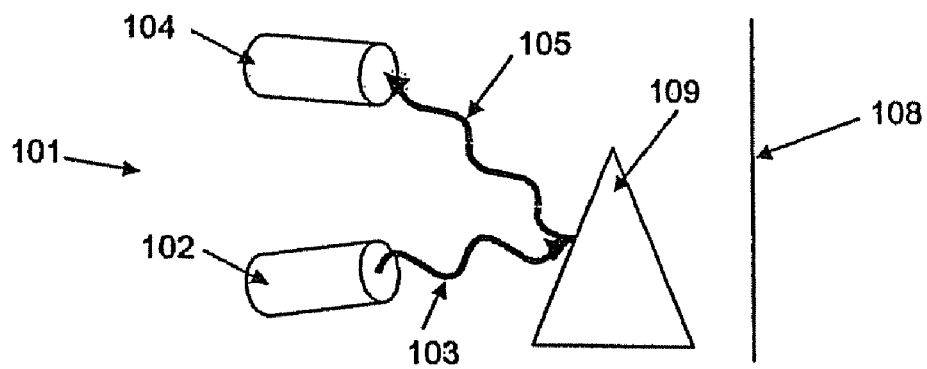
Figure 7:
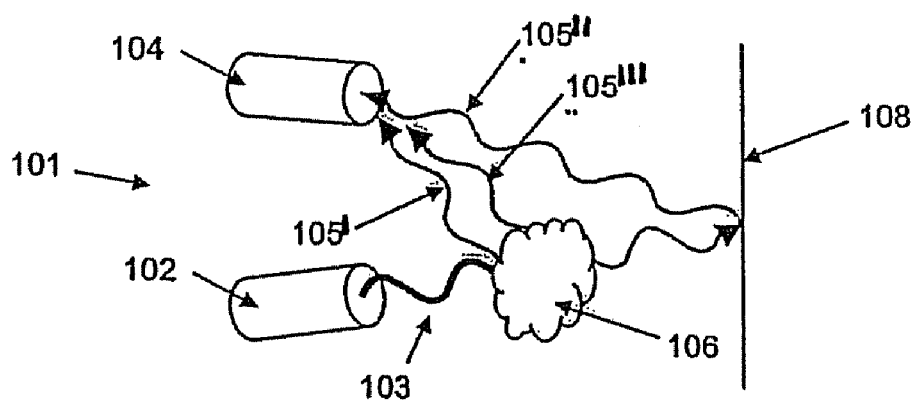

FIGS. 5 to 7 illustrate a light sensor arrangement 101 that is able to measure a distance. A sensor 102 emits modulated light 103. The light can be modulated sinusoidally or in some other pulsed fashion, by way of example. The light 103 is reflected from a reference surface 108.

If the light 103 is reflected from an object 109, then the light path is shortened, which the light sensor arrangement 101 detects and associates this shortening with an object in the path of the light 103.

In FIG. 7, the modulated light impinges on smoke 106. Part of the light 105', 105''' is reflected directly at the smoke 6 back to a receiver 104. A further part 105" passes back to the receiver 104 via the reference surface 108. Light components which, although they have the same frequency, have different phase angles on account of the distance differences thus arrive at the receiver 104. The light sensor arrangement is preferably able to evaluate directly or indirectly these different phase angles, which do not occur or do not occur to that extent if a reflection takes place at the reference surface 108 or at the object 109, and accordingly to output a signal that is associated with the detection of smoke.

We claim:

1. A device for controlling a driven movement element with an electronic unit, which comprises:
    a transmitter for emitting electromagnetic radiation and a receiver for receiving electromagnetic radiation emitted by the transmitter for the detection of objects on a propagation path between the transmitter and the receiver, wherein a person who moves into the propagation path of the light is detectable;

wherein the electronic unit detects a temporal change in at least one feature derived from the electromagnetic radiation received by the receiver and, upon a detection of a change in the at least one feature outputs a signal that is associated with a detection of smoke;

wherein the electronic unit performs, in a predefined time, a plurality of measurements of a feature that is representative of the intensity of the received electromagnetic radiation; and wherein the electronic unit determined the time from the instant at which the feature that is representative of the intensity exceeds a first threshold from the top downward to the instant at which the feature that is representative of the intensity exceeds a second, lower threshold from the top downward.

2. The device as claimed in claim 1, wherein the electronic unit, depending on the intensity of a received electromagnetic radiation, generates a signal that is associated with a detection of an object if the intensity changes abruptly, and generates a signal that is associated with a detection of smoke if the intensity changes slowly as measured against the abrupt change in the intensity upon detection of an object.

3. The device as claimed in claim 1, wherein the electronic unit determines a distance which the electromagnetic radiation covers from the transmitter via a reflection surface to the receiver by an evaluation of a phase of an oscillation modulated onto the electromagnetic radiation, in which case, upon a detection at the receiver of electromagnetic radiation that deviates from the modulated oscillation on account of a plurality of superposed oscillations having the same frequency but a different phase angle, smoke in the light path is inferred.

4. The device as claimed in claim 1, wherein the receiver has a plurality of reception regions that are evaluated separately, and the electronic unit determines a distance which the electromagnetic radiation covers from the transmitter via a reflection surface to the receiver by an evaluation of a phase of an oscillation modulated onto the electromagnetic radiation, in which case, upon a detection of a comparatively slowly changing distance for respectively the plurality of reception regions, smoke in the light path is inferred.

5. The device as claimed in claim 1, wherein the receiver has a plurality of reception regions that are evaluated separately, and the electronic unit determines a distance which the electromagnetic radiation covers from the transmitter via a reflection surface to the receiver by an evaluation of a phase of an oscillation modulated onto the electromagnetic radiation, in which case, upon a detection of a comparatively slowly changing distance through to an identical distance for respectively the plurality of reception regions, smoke in the light path is inferred.

6. The device as claimed in claim 1, wherein a plurality of receivers and transmitters are provided.

7. The device as claimed in claim 1, wherein the receiver comprises a camera chip.

8. The device as claimed in claim 1, wherein at least one feature further comprises a feature that is representative of the contrast of the image, a comparatively slow decrease in the contrast being interpreted as smoke.

9. The device as claimed in claim 8, wherein the electronic unit uses an edge detected by the receiver as a basis for the detection of the feature that reflects the contrast.

* * * * *